(12) United States Patent
Graupner et al.

(10) Patent No.: US 8,452,717 B2
(45) Date of Patent: May 28, 2013

(54) PRESENTING AN INTERACTIVE GUIDANCE STRUCTURE IN A COLLABORATIVE ENVIRONMENT

(75) Inventors: Sven Graupner, Mountain View, CA (US); Sharad Singhal, Belmont, CA (US); Sujoy Basu, Sunnyvale, CA (US); Hamid Reza Molahari Nezhad, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 462 days.

(21) Appl. No.: 12/768,169

(22) Filed: Apr. 27, 2010

(65) Prior Publication Data
US 2011/0264611 A1 Oct. 27, 2011

(51) Int. Cl.
*G06N 5/00* (2006.01)

(52) U.S. Cl.
USPC .............................................. 706/12; 706/45

(58) Field of Classification Search
USPC ...................................................... 706/12, 45
See application file for complete search history.

(56) References Cited

U.S. PATENT DOCUMENTS

| | | |
|---|---|---|
| 7,114,146 B2 | 9/2006 | Zhang |
| 7,565,640 B2 | 7/2009 | Shukla |
| 7,567,915 B2 | 7/2009 | Hammitt |
| 2004/0024622 A1 | 2/2004 | Knight |
| 2004/0162741 A1 | 8/2004 | Flaxer |
| 2007/0265895 A1 | 11/2007 | Moore |
| 2008/0033993 A1 | 2/2008 | Uceda-Sosa |
| 2009/0006167 A1 | 1/2009 | Toussaint |
| 2009/0171720 A1 | 7/2009 | Crook |
| 2009/0281865 A1 | 11/2009 | Stoitsev |

FOREIGN PATENT DOCUMENTS

| | | |
|---|---|---|
| WO | WO02/05508 | 1/2002 |
| WO | WO2005/052720 | 6/2005 |

OTHER PUBLICATIONS

Rossberg, Pro Visual Studio Team System Application Lifecycle Management, Apress, 2008, pp. 1-333.*
Ameline et al., Medical Ontology & Virtual Staff for Knowledge Management in a Health Network (23 pages) (document created Feb. 13, 2006).
Jiangning Wu et al., A Framework for Ontology-Based Knowledge Management System, Aug. 21, 2005 (9 pages).
Ramamurthy, Chapter 11, Ontology-based Knowledge Management in the Steel Industry, Dec. 15, 2009 (30 pages).
Website SAP (http://www.sap.com/netherlands/platform/netweaver/pdf/brochures/BWP_NetWeaver_BPM.pdf) Business Process Management with SAP NetWeaver, Apr. 2004 (4 pages).
IMS (Innovative Adoption Learning), Version 1.0 White Paper, Adoption of Service Oriented Architecture for Enterprise Systems in Education: Recommended Practices dated Sep. 2009 (44 pages).
Ardissono et al., Summary of "From Service Clouds to User-Centric Personal Clouds", Sep. 21-25, 2009 (1 page).

(Continued)

*Primary Examiner* — Wilbert L Starks (57) ABSTRACT

A collaborative work environment is provided that supports collaboration among users for performance of a people service that is associated with ad-hoc activities. An information base is provided that includes information relating to responsibilities of the users and work items for the ad-hoc activities. An interactive guidance structure is presented in the collaborative environment to guide actions of the users with respect to the work items. Materials produced as a result of the actions to update the information base are collected.

21 Claims, 5 Drawing Sheets

OTHER PUBLICATIONS

White Paper, The Correct Shared Services Model Increases Business Process Efficiencies from www.keymarkinc.com (document dated Mar. 9, 2006) (4 pages).

Website, Wikipedia, http://en.wikipedia.org/wiki/Wiki dated Apr. 3, 2010 (7 pages).

Graupner, HP Laboratories, Making Processes from Best Practice Frameworks Actionable dated Sep. 6, 2009 (11 pages).

Graupner et al., U.S. Appl. No. 12/768,178 entitled Template-Based Technique for Making a Best Practices Framework Actionable filed Apr. 27, 2010 (34 pages).

Nezhad et al, U.S. Appl. No. 12/768,174 entitled Dynamic Collaborative Adaptation of a Business Activity in a Business Activity Management System filed Apr. 27, 2010 (34 pages).

* cited by examiner

PRESENTING AN INTERACTIVE GUIDANCE STRUCTURE IN A COLLABORATIVE ENVIRONMENT

BACKGROUND

An organization can perform various services, either to support customers external to the organization or to support various projects within the organization. The provision of services is generally in an ad-hoc manner. Often, one project or one group of users may perform actions with little coordination with other projects or other groups of users.

BRIEF DESCRIPTION OF THE DRAWINGS

Some embodiments are described with respect to the following figures.

DETAILED DESCRIPTION

To provide deliverables (services or goods) to external customers or to other users within an organization, various services are performed by personnel in the organization. Examples of organizations include a company, an educational organization, a government agency, departments or divisions of any such company, educational organization, or government agency, and so forth. Services performed by personnel are referred to as "people services," which refer to services that involve humans for service delivery. Examples of people services include assessment services, consulting services, project development services, deployment services, operational services, management services, and/or others.

Often, people services are delivered in an un-planned manner, which means that different projects or different groups of users may not plan their actions with each other, even if there is some relation between the projects or groups of users. Also, coordination occurs as an ad-hoc activity. Moreover, prior work is often not leveraged to allow for the performance of people services to be more efficient. In performing people services, users tend to recreate work that had previously been performed, which results in inefficiencies and increased costs.

Also, activities of a people service tend to be ad-hoc in nature, which means that such activities can differ from project to project or when performed by different persons. Conventional management tools do not provide efficient mechanisms for managing ad-hoc activities of people services—such conventional management tools tend to focus more on executing hardcoded software processes rather than on supporting ad-hoc activities in a collaborative environment that potentially can have many users.

In accordance with some embodiments, a services coordination system is provided to allow for people services within an organization (or between organizations) to be performed in a more efficient manner. The services coordination system allows for the performance of people services to become more standardized and repeatable, which can result in reduced labor or other costs. In some implementations, the performance of a people service is within a "cloud" environment, which refers to a collaborative work environment that supports collaboration among users in performing the people service. The ability to standardize and render repeatable people services allows for more efficient collaboration, particularly in a collaborative environment that can involve many users, such as in a relatively large organization.

Figure 1:
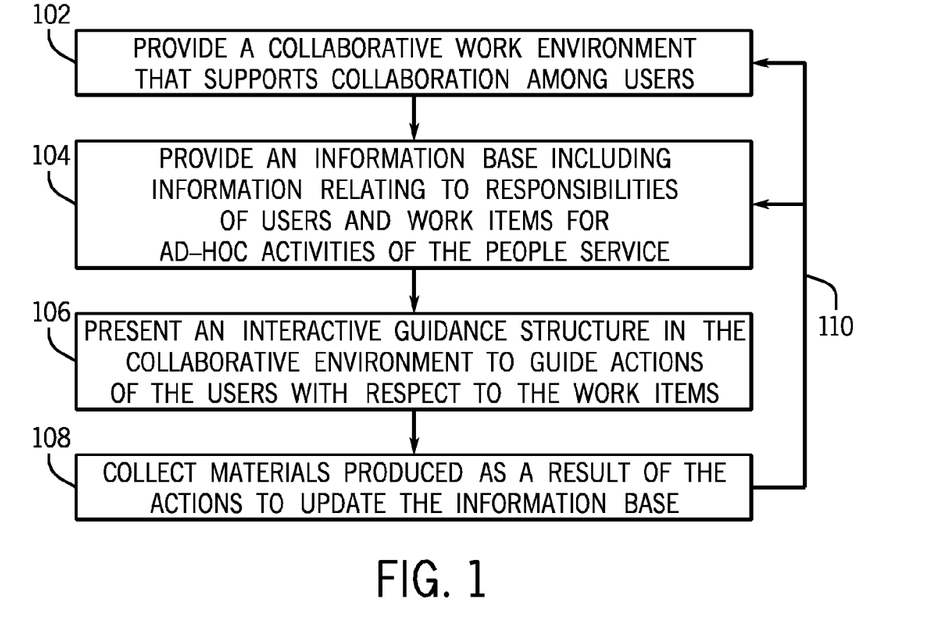
FIG. 1 is a flow diagram of the process of collaboratively performing people services, in accordance with some embodiments.

FIG. 1 illustrates a process according to some implementations performed by the services coordination system. The services coordination system provides (at 102) a collaborative work environment that supports collaboration among users for performing a people service associated with ad-hoc activities. The services coordinating system also provides (at 104) an information base that includes various information, including information relating to responsibilities of the users and work items defining the ad-hoc activities to be accomplished for the people service.

The services coordination system also presents (at 106) an interactive guidance structure in the collaborative environment to guide actions of the users with respect to the work items. The interactive guidance structure is also able to receive user selections of work items to be performed. In this manner, interaction is possible between the users and the services coordination system by use of the interactive guidance structure. The services coordination system also collects (at 108) materials produced as a result of the actions of the users with respect to the work items, where the collected materials are used to update the information base (as indicated by feedback loop 110). Examples of collected materials include documents or any other information relating to performance of people services.

For enhanced efficiency, the interactive guidance structure of the collaborative environment can be populated with information (e.g., pages) derived from a previously created template (or multiple templates), where the template(s) is (are) created based on the collected materials (as indicated by feedback 110 in FIG. 1). The previously created template(s) refer(s) to data structure(s) containing various information collected in the performance of a people service (or multiple people services). Using a previously created template (or multiple previously created templates) to populate information in the interactive guidance structure according to some embodiments allows for experience and knowledge derived from prior performances of people services to be leveraged in a coordinated manner for use in the performance of a current people service. For example, using the templates, the interactive guidance structure can be populated with documents from previous performances of a people service.

Procedures described by templates can be used to guide the activities of the users. In this manner, interactions and collaboration of people in the performance of people services can be guided by the services coordination system. In addition, by reusing templates and updating an information base of the services coordination system, repeatability of people services (which tend to be ad-hoc in nature) is enhanced.

By using the services coordination system according to some implementations, better coordination of activities associated with the performance of people services can be accomplished. The services coordination system does not just manage documents or workflows, but rather has the enhanced capability of managing ad-hoc activities in a collaborative environment for delivery of people services in a more standardized and repeatable manner.

Figure 2:
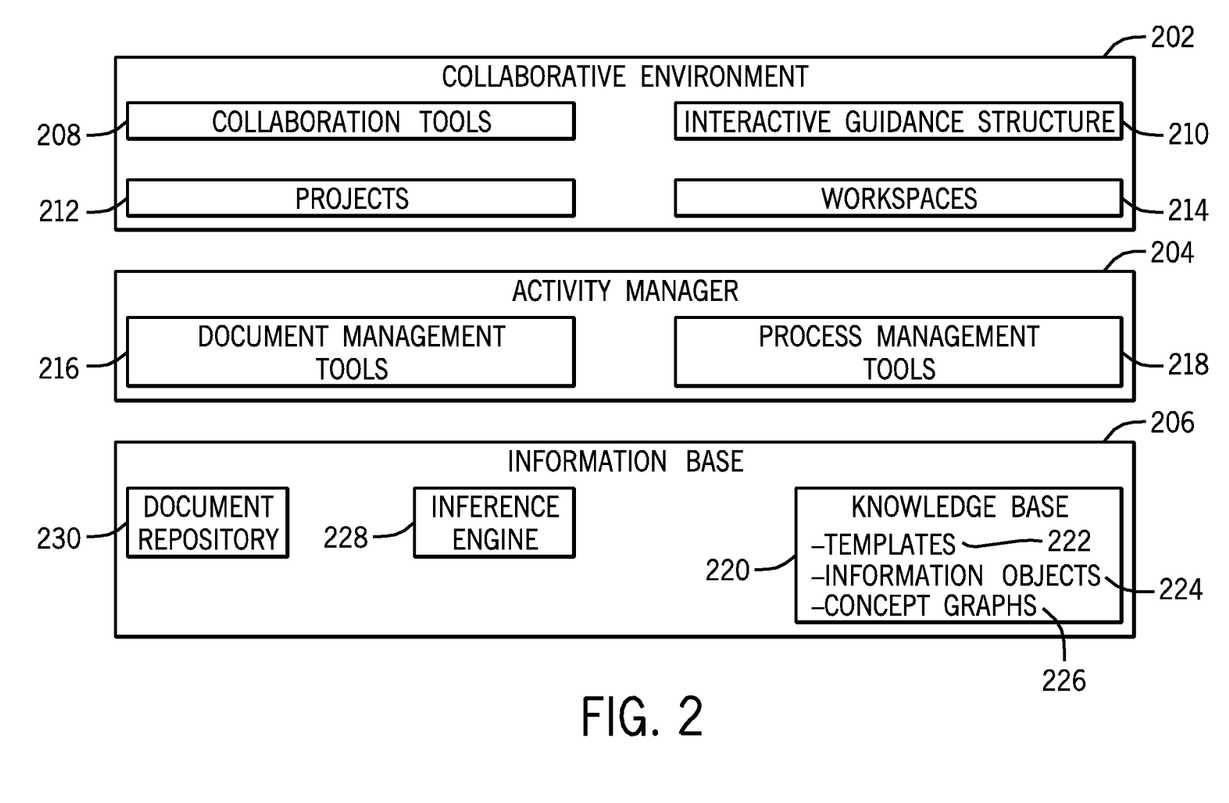
FIG. 2 is a block diagram of an architecture of a services coordination system, in accordance with some embodiments.

FIG. 2 is a block diagram of an architecture of the services coordination system according to some implementations, where the services coordination system is able to perform the procedure of FIG. 1. The architecture of FIG. 2 includes a collaborative environment 202, an activity manager 204, and an information base 206. The collaborative environment 202 includes collaboration tools 208 to allow users to interact among themselves, as well as with underlying systems, such as the activity manager 204 and the information base 206.

The collaborative environment 202 also provides an interactive guidance structure 210, such as an interactive navigation structure that allows users in the collaborative environment 202 to navigate to different pieces of information such that the users can be provided with guidance regarding details of work items that are to be performed when performing a people service. For example, the interactive navigation structure 210 can present the work items as selectable links that can be selected by users to navigate to pages that contain information relating to the work items. The information of the pages can be populated with content of a previously created template (or multiple previously created templates).

The people service to be performed in the collaborative environment 202 can be represented by projects 212 (or alternatively, just by one project 212). A project represents a temporary (short-lived) grouping of users and activities for performance of the people service. Also, the collaborative environment 202 includes workspaces 214 associated with the users of the projects 212. Each workspace 214 provides a perspective for an individual user (or a group of users).

The information relevant to a project (or to an individual or group of individuals) can be presented within a workspace 214 (through the interactive guidance structure 210) set up for the project (or individual or group of individuals). Each workspace 214 shows work items that are actionable by the workspace owner. The work items presented in the workspace can be changed as work associated with the people service is changed, as work is assigned to different users, or as work is completed by respective users.

The activity manager 204 facilitates the flow of activities among users for performing a people service. The activity manager 204 is configured to present work items in corresponding workspaces 214 such that a respective user or group of users can perform the work items. Definition and execution of ad-hoc activities are thus provided based on presentation of the work items in corresponding workspaces 214 by the activity manager 204.

The activity manager 204 also guides the evolution of information held in the information base 206 in accordance with templates. The templates are configurable to account for new context and new projects. Using information from the templates, the activity manager 204 is able to orchestrate the flow of activities between users.

The activity manager 204 is also able to link into domain-specific tools that augment, correlate, and in some cases generate documents intended for people working in the services coordination system.

As shown in FIG. 2, the activity manager 204 includes document management tools 216 (for managing content of documents), and process management tools 218 (for managing activities associated with work items).

According to some examples, the information base 206 includes a knowledge base 220 that contains templates 222, information objects 224, and concept graphs 226. The templates 222 were previously created and stored into the knowledge base 220, where the previously created templates 222 are based on performance of prior people services. The knowledge base 220 effectively provides context information to the services coordination system. The templates 222 can be created based on any of the following frameworks: ITIL (Information Technology Infrastructure Library), BMM (Business Motivation Model), or others.

Individual information elements are abstracted as information objects 224 within the knowledge base 220. Relationships between the information objects 224 are captured as context graphs 226. The content of the information objects 224 is discussed further below.

The information base 206 also includes an inference engine 228 to provide query and inference capability over the templates 222. In addition, the information base 206 includes a document repository 230 that contains the documents being managed. The information objects 224 hold references to the documents in the document repository 230, so that the inference engine 228 is able to determine dependencies among the documents of the document repository 230, to create and delete dependencies between documents as the context specifies, and/or to organize the documents within the context of a domain framework.

The information that is associated with the information objects 224 of the knowledge base 220 can include at least some of the following. One type of information includes roles and responsibilities of users participating in a collaboration for a particular people service. The roles and responsibilities allows the services coordination system to recognize the relationships and dependencies between a given user and other users of the collaborative environment 202.

Another type of information maintained by the knowledge base 220 includes information relating to work items of interest within a domain. The information relating to work items allow information of the information base 206 to be linked together and organized in accordance with an underlying domain framework, and allows workflows to be created between collaborating users.

Another type of information in the knowledge base 220 includes work items to be accomplished, such as risk assessment for a people service, a return-on-investment (ROI) analysis for a people service, and so forth. The work items can be assigned by users, or the work items can be generated by the activity manager 204 as a consequence of work being done by someone else.

Another type of information held in the knowledge base 220 includes document annotations that capture information relevant for linking work items. For example, templates can be annotated by users during collaborative performance of people services. The annotations can be extracted to allow the activity manager 204 to automatically update (and in some instances, generate) documents being held elsewhere in the information base 206.

A further type of information in the knowledge base 220 includes events for coordinating activities. As documents are updated or changed, events are generated to allow communication with underlying tools or with collaborating users.

The foregoing information objects can be contained in the knowledge base 220 in a data store, which can be according to the Resource Description Framework (RDF), or according to some other framework. The concepts are used to drive functionality implemented by the services coordination system. For example, when a document is uploaded to the services coordination system by a user, a work item can be triggered to request that another user approve the release of the document. This work item can be associated with a timer indicating a timeline for approval. A request can then be routed to the approver with either some link to the document, such as a uniform resource locator (URL) link, or the corresponding document can be added to the approver's personal workspace for review.

Figure 3:
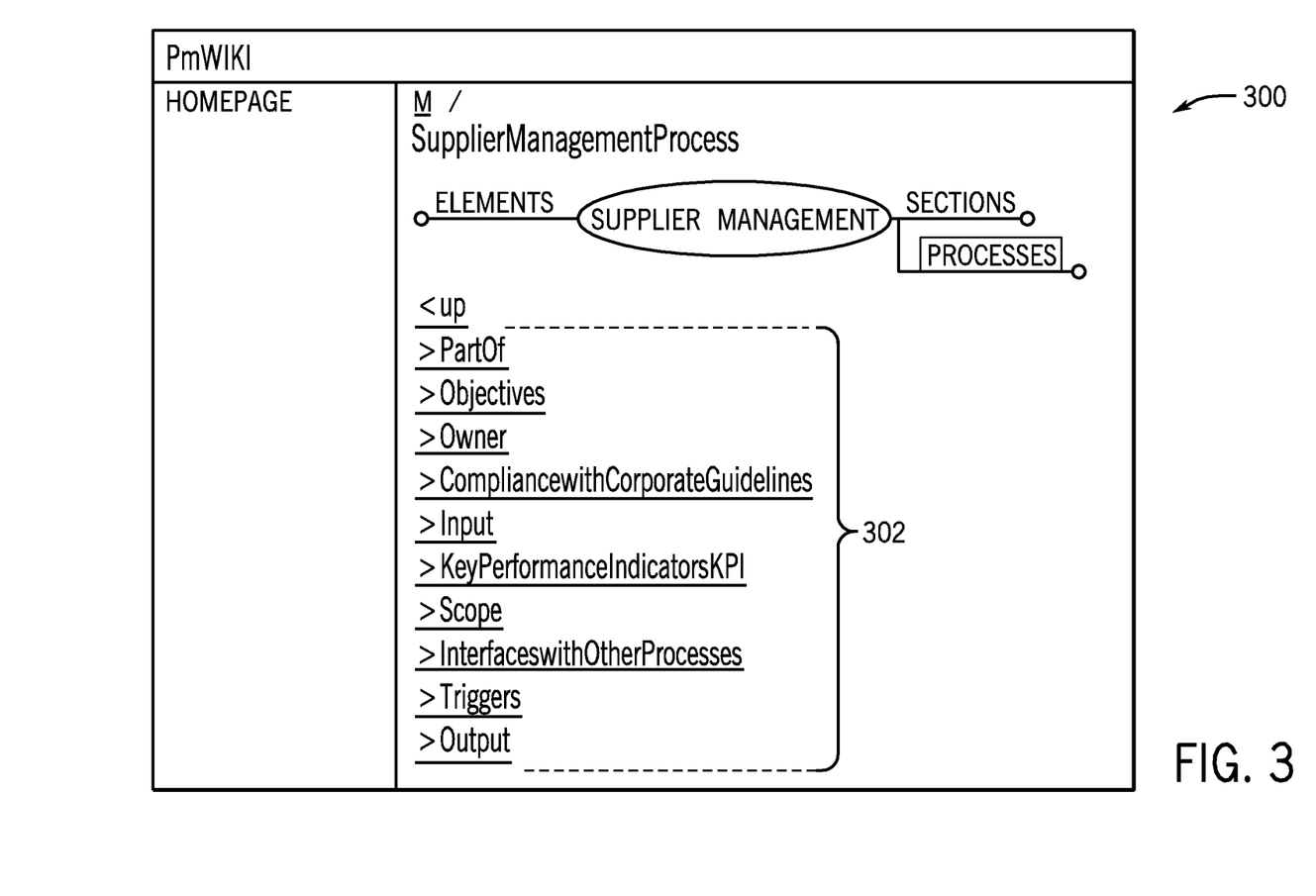
FIG. 3 is a graphical user interface screen presented by the services coordination system according to some examples.

FIG. 3 shows an example user interface screen that can be presented in the collaborative environment 202 of FIG. 2. The example graphical user interface (GUI) screen of FIG. 3 is an example of the interactive guidance structure 210 depicted in FIG. 2. The GUI screen 300 of FIG. 3 shows work items 302 that are in the form of selectable links that can be selected by users of the collaborative environment 202. The GUI screen 300 is an example of a representation of an underlying concept graph that allows a user to go to different pieces of information (in the form of pages) relating to different work items that are to be performed. Thus, a user can browse the concept graph as different interactive pages. The user can also upload and edit documents relevant to a corresponding work item or people service.

The GUI screen 300 of FIG. 3 depicts a page in Wiki format. A wiki is a website that allows for the creation and interlinking of web pages using a simplified markup language or a text editor. In other implementations, other types of formats can be employed.

As an example, suppose a project to select a supplier is created (referred to as "Supplier Management Process"). Such a project represents a type of people service. The services coordination system generates the relevant pages (e.g., Wiki pages that are linked together) for each relevant work item as part of the project creation. The pages are populated with information from templates that have been previously created. This enables users working on the project to quickly navigate to relevant information associated with the work items. The users can review such information, or also update such information.

Because the information associated with the corresponding pages stay fixed, the knowledge base can use such information to drive other tasks. In addition, because users can create other pages and link them to existing pages, new content can be uploaded into the pages, or links between pages can be modified. In this manner, users can easily customize a project to the goals of the users. This allows the users to rapidly organize project information aligned with a template (or multiple templates), rather than using arbitrary hierarchies. Also, relevant documents can be automatically organized within the collaborative environment, and project information created by one group of people stays accessible (through the collaborative environment 202) to others who may not otherwise know about such information, which increases efficiency within the project.

As changes are made, the activity manager 204 can capture updates made to the information, to cause the knowledge base 206 to evolve as users work with the knowledge base. Also such updates can be reflected in corresponding workspaces 214 presented in the interactive guidance structure 210.

Moreover, additional templates may be created from documents uploaded by the users during work associated with the work items. This enables the knowledge base to expand and become customized as users work with the knowledge base. Consequently, domain experts do not have to be involved to perform modification.

It is also straightforward to duplicate an entire project hierarchy (including linked pages and corresponding work items) for a new project that is similar to a previous project, thereby enhancing the ability to reuse documents and templates across projects, mine information across related projects, or evolve templates across projects.

Figure 4:
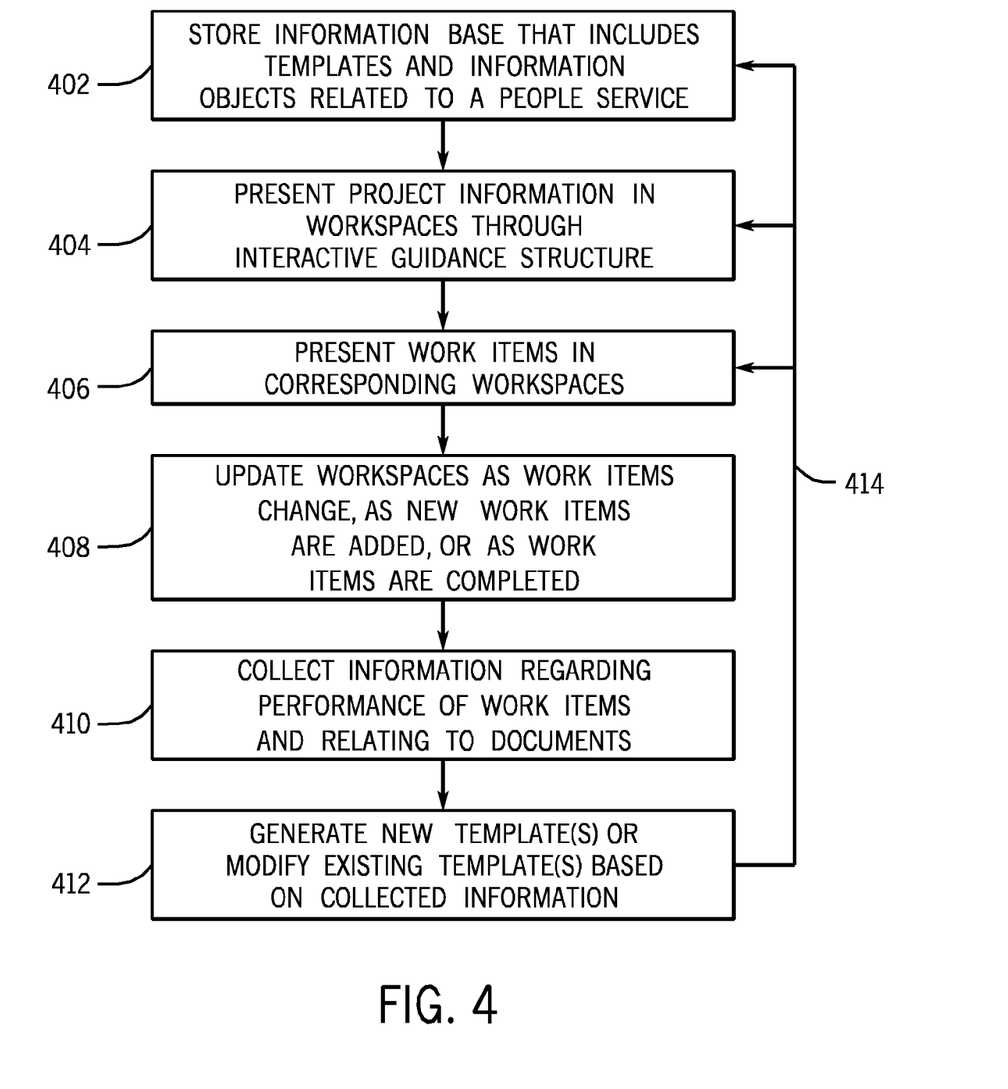
FIG. 4 is a flow diagram of a process for collaboratively performing people services, according to further embodiments.

FIG. 4 is a flow diagram of a process according to further embodiments, where the process can be performed by the services coordination system. The information base 206 (FIG. 2) is stored (at 402) by the services coordination system where the information base 206 includes templates (222 in FIG. 2) and information objects (224) related to a people service that is to be performed. The information base 206 can also contain other information, as discussed above.

Project information is presented (at 404) in corresponding workspaces 214 (FIG. 2) through the interactive navigation structure 210, which allows users in the collaborative environment 202 to retrieve and/or update information relevant to different work items.

Work items are presented (at 406) in each workspace associated with a corresponding user or group of users. Each workspace can be updated (at 408) as work items change, as new work items are added, or as work items are completed. The different workspaces associated with different users (or groups of users) can be updated differently.

Also, information is collected (at 410) regarding performance of the work items, and relating to documents that have been created, added, or updated as part of the performance of the people service. Based on the collected information, new template(s) can be generated or existing template(s) can be modified (at 410). The new or modified template(s) can be fed back (414) to tasks 402, 404, 406.

The following describes an example of how the services coordination system can be used. It is assumed that a first user is a manager (assigned the role and responsibility of a manager), while a second user works under the manager. A work item that is presented in the workspace 214 (FIG. 2) of the manager requests the first manager to define a task for assignment to the worker. Once the task is assigned, this assigned task is represented as another work item in the workspace 214 of the worker. The work items in the respective workspaces 214 can be presented to the respective manager and worker using the interactive guidance structure 210 (such as the page 300 shown in FIG. 3).

The worker can receive some indication of the worker's work item, along with a reference to the workspace created for the worker by the services coordination system to perform the worker's assignment. Using the interactive guidance structure 210, the worker can open the worker's workspace to find the work item. The worker can perform the requested task and can update the information in the worker's workspace to indicate that the work item has been completed. The services coordination system observes the changes and marks the work item as being done, which in turn updates the status of the work item in the manager's workspace. For example, the manager's workspace can present a task list for different work items assigned to different workers, where this task list can have associated status indicators to indicate whether the corresponding work items have been completed, in progress, or have not yet been started.

Figure 5:
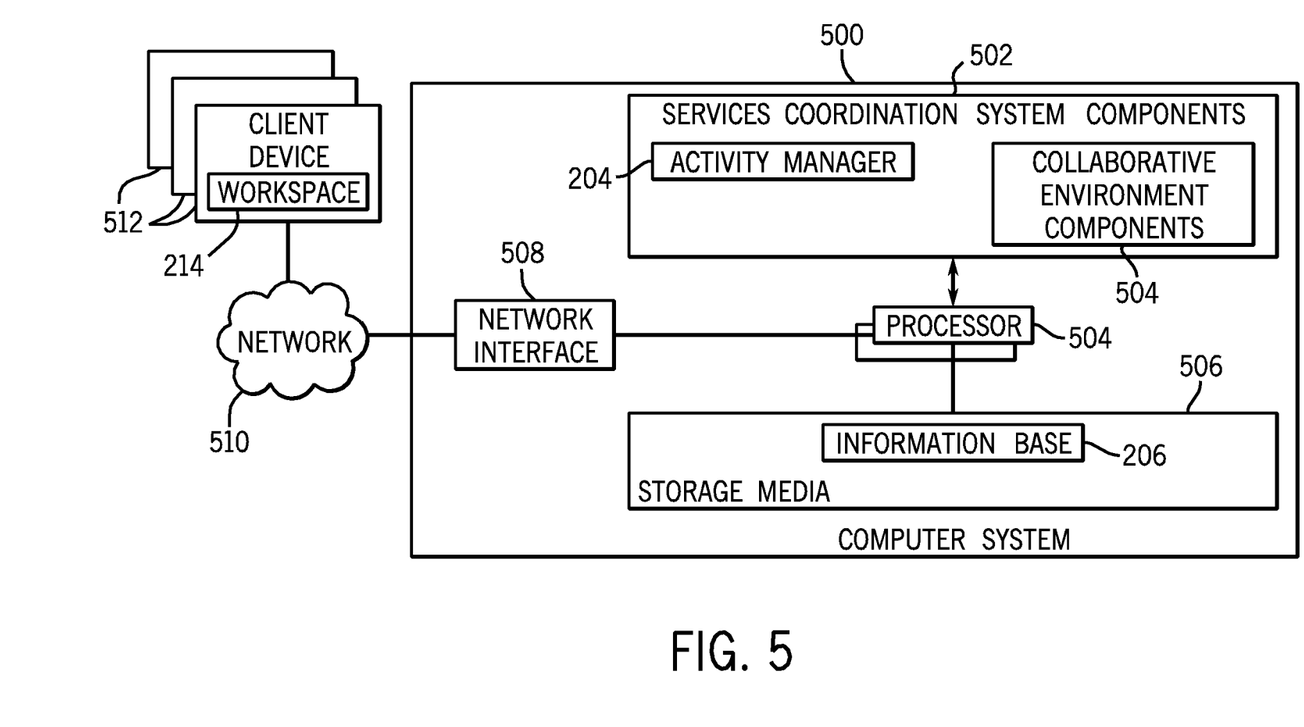
FIG. 5 is a block diagram of an example system incorporating some embodiments.

FIG. 5 illustrates an example arrangement in which some implementations can be incorporated. The arrangement includes a computer system 500, which can be a single computer, or a collection of computers that are distributed. A "computer" refers to any electronic device, such as a desktop computer, a notebook computer, a server computer, a multiprocessor computer, a personal digital assistant, and so forth. The computer system 500 includes various services coordination system components 502 that are executable on one or multiple processors 504. The services coordination system components 502 include the activity manager 204, and collaborative environment components 504, such as those shown in FIG. 2.

The one or multiple processors 504 are connected to storage media 506, which contains the information base 206. A network interface 508 is connected to the processor(s) 504, which allows the computer system 500 to communicate over a data network 510 with client devices 512. In some examples, the client devices 512 are associated with corresponding users that collaborate to perform people services. Workspaces 214 are presented in respective client devices 512, where the workspaces 214 are part of the collaborative environment 202 discussed above.

Machine-readable instructions of various modules described above (including the services coordination system components of FIG. 5) are loaded for execution on a processor (e.g., 504). A processor can include a microprocessor, microcontroller, processor module or subsystem, programmable integrated circuit, programmable gate array, or another control or computing device.

Data and instructions are stored in respective storage devices, which are implemented as computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
providing, by a computer system, a collaborative work environment that supports collaboration among users for performance of a people service that is associated with ad-hoc activities;
providing, by the computer system, an information base that includes information relating to responsibilities of the users and work items for the ad-hoc activities;
presenting, by the computer system, an interactive guidance structure in the collaborative environment to guide actions of the users with respect to the work items;
collecting, by the computer system, materials produced as a result of the actions to update the information base; and
populating the interactive guidance structure with information derived from a previously created template, the previously created template being based on materials collected in a performance of actions by users for another people service.

2. The method of claim 1, wherein populating the interactive guidance structure with the information derived from the previously created template comprises populating the interactive guidance structure with documents that are related to work items for ad-hoc activities of the another people service.

3. The method of claim 1, wherein the another people service is associated with a hierarchy of work items, and wherein populating the interactive guidance structure comprises copying a hierarchy of work items of the previously created template.

4. The method of claim 1, further comprising:
generating a new template based on at least one of the materials produced as a result of the actions with respect to the work items; and
adding the new template to the information base.

5. The method of claim 4, further comprising presenting a further interactive guidance structure populated with information derived from the new template, the further interactive guidance structure to guide actions of users with respect to work items for ad-hoc activities of a further people service.

6. The method of claim 1, further comprising providing workspaces for corresponding users or groups of users, wherein work items associated with the users or groups of users are presented in respective ones of the workspaces.

7. The method of claim 6, further comprising:
in response to input of a first of the users in a first of the workspaces, generate a particular work item to place in a second of the workspaces associated with a second of the users.

8. The method of claim 7, further comprising in response to an update in status of the particular work item due to action of the second user, providing an indication corresponding to the update in status in the first workspace.

9. The method of claim 1, wherein the information included in the information base includes information objects that are linked with respect to one another, wherein presenting the interactive guidance structure comprises presenting a plurality of pages associated with corresponding ones of the work items, and wherein the plurality of pages contain information of corresponding ones of the information objects according to the linked information objects.

10. The method of claim 1, further comprising using the information relating to responsibilities of users to determine relationships among the users.

11. An article comprising at least one non-transitory computer-readable storage medium storing instructions that upon execution cause a computer system to:
present a collaborative environment in which a plurality of users are presented with respective workspaces that contain information relating to work items corresponding to ad-hoc activities of a people service to be performed by a collaboration of the plurality of users;
obtain the information relating to the work items from at least one template associated with prior performance of the people service, wherein the at least one template allows knowledge gained from the prior performance of the people service to be applied for reuse, wherein the at least one template is based on materials collected in the prior performance of the people service; and
provide updates in the workspaces as status of the work items change during performance of the people service.

12. The article of claim 11, wherein the instructions upon execution cause the computer system to further:
collect materials based on actions relating to the work items; and
create a new template or update an existing template based on the collected materials based on the actions relating to the work items for subsequent use.

13. The article of claim 12, wherein the collected materials based on the actions relating to the work items include a document uploaded by at least one of the users, and wherein creating the new template or updating the existing template is based on the uploaded document.

14. The article of claim 12, wherein the instructions upon execution cause the computer system to further present an interactive guidance structure populated with information derived from the new template or the updated existing template, the interactive guidance structure guiding actions of the users with respect to work items corresponding to ad-hoc activities of a further people service.

15. The article of claim 11, wherein presenting the collaborative environment comprises presenting an interactive navigation structure to allow users to navigate to pages relating to work items corresponding to the users.

16. The article of claim 15, wherein presenting the interactive navigation structure comprises presenting the pages having user-selectable links to allow for navigation among the pages, wherein each of the pages contain information relating to a corresponding one of the work items to guide a user or group of users in performing actions with respect to the corresponding work item.

17. The article of claim 11, wherein the instructions upon execution cause the computer system to further present an interactive guidance structure populated with information derived from the at least one template, the interactive guidance structure guiding actions of the users with respect to the work items.

18. A computer system comprising:
    a storage media to store an information base having information relating to work items corresponding to ad-hoc activities of a people service; and
    at least one processor configured to:
        provide a collaborative work environment that supports collaboration among users for performance of the people service;
        present an interactive guidance structure in the collaborative environment to guide actions of the users with respect to the work items;
        collect materials produced as a result of the actions to update the information base; and
        generate a template containing information representing knowledge based on the collected materials, wherein the generated template is useable for performance of a subsequent people service.

19. The computer system of claim 18, wherein the at least one processor is configured to further:
    present information in the interactive guidance structure with respect to at least some of the work items based on templates associated with prior performance of a particular people service, the templates associated with the prior performance based on materials collected in performance of actions by users for the particular people service.

20. The computer system of claim 18, wherein the at least one processor is configured to further:
    provide workspaces for corresponding users or groups of users, wherein work items associated with the users or groups of users are presented in respective ones of the workspaces.

21. The computer system of claim 20, wherein the at least one processor is configured to further:
    in response to input of a first of the users in a first of the workspaces, generate a particular work item to place in a second of the workspaces associated with a second of the users; and
    in response to an update in status of the particular work item due to action of the second user, provide an indication corresponding to the update in status in the first workspace.

* * * * *